United States Patent [19]
Bruni et al.

[11] Patent Number: 5,498,948
[45] Date of Patent: Mar. 12, 1996

[54] SELF-ALIGNING INDUCTIVE CHARGER

[75] Inventors: Michael F. Bruni, Redondo Beach; Edward F. Davenport, Rancho Palos Verdes, both of Calif.

[73] Assignee: Delco Electornics

[21] Appl. No.: 323,287

[22] Filed: Oct. 14, 1994

[51] Int. Cl.$^6$ .................................................. H01M 10/46
[52] U.S. Cl. ............................................................ 320/2
[58] Field of Search ........................ 320/2, 5; 180/65.1, 180/65.2, 65.3; 307/9.1, 10.1

[56] References Cited

U.S. PATENT DOCUMENTS

| | | | |
|---|---|---|---|
| 4,158,802 | 6/1979 | Rose, II | 320/2 |
| 4,496,896 | 1/1985 | Melocik et al. | 320/2 |
| 4,800,328 | 1/1989 | Bolger et al. | 320/2 |
| 5,049,802 | 9/1991 | Mintus et al. | 320/2 |
| 5,252,078 | 10/1993 | Langenbahn | 320/2 X |
| 5,272,431 | 12/1993 | Nee | 320/2 |

*Primary Examiner*—Peter S. Wong
*Assistant Examiner*—Edward Tso
*Attorney, Agent, or Firm*—Mark A. Navarre; Leonard A. Alkov

[57] ABSTRACT

A self-aligning inductive charging system for automatically mating a charge probe to a charge port without operator interaction to charge propulsion batteries of an electric vehicle. A charge station includes a power source, a charge probe coupled to a slidable alignment mechanism, and a charge port disposed in the electric vehicle that is coupled to its propulsion batteries. The charge probe comprises a plurality of aligning plates disposed at predetermined locations around the periphery thereof. The slidable alignment mechanism comprises a plurality of vertical slide mechanisms, a plurality of horizontal slide mechanisms coupled between the plurality of vertical slide mechanisms, and a plurality of lateral slide mechanisms coupled to the plurality of horizontal slide mechanisms and to the charge probe. The charge port comprises a secondary core, a secondary winding connected to the propulsion batteries, a vehicle brake switch for sending a signal that causes the electrical vehicle to stop when the charge port is properly inserted into the charge probe, and a plurality of rollers disposed adjacent a front surface of the charge port that contact corresponding ones of the aligning plates when the probe is inserted into the charge port. When the electric vehicle pulls up to the charge station, if the charge probe and charge port are misaligned, one or more of the rollers contact the aligning plates which cause the charge probe to move in a direction opposite the force exerted by the rollers on the aligning plates. Consequently, the charge probe is caused to move up, down, or laterally, so that it is aligned with the charge port. Thus, as the electric vehicle pulls forward, the charge moves to align with the charge port. The vehicle brake switch sends a signal to stop the electric vehicle 11 when the charge probe is properly inserted into the charge port.

8 Claims, 2 Drawing Sheets

SELF-ALIGNING INDUCTIVE CHARGER

BACKGROUND

The present invention relates generally to inductive charging systems, and more particularly to a self-aligning inductive charging system for automatically mating a charge port to a charge probe without operator interaction.

Heretofore, magna-charging concepts have been employed to charge the propulsion batteries of electric vehicles. In the magna-charging concept, a charge probe that is electrically coupled to a power source is inserted into a secondary charge port by a driver of the electric vehicle. The charge probe carries many amperes of current and this device must be properly inserted into the charge port to insure proper charging. To minimize concerns about user safety when handling the charge probe it is desirable to have a charging mechanism that does not require a user to physically hold the charge probe. The present invention addresses this concern.

Therefore, it is an objective of the present invention to provide a self-aligning inductive charging system for automatically mating a charge port to a charge probe without operator interaction.

SUMMARY OF THE INVENTION

In order to meet the above and other objectives, the present invention is a self-aligning inductive charging system for automatically mating a charge probe to a charge port without operator interaction. The present invention improves upon magna-charging concepts for electric vehicles. The present invention is a self-aligning inductive charging system for charging propulsion batteries of an electric vehicle.

The self-aligning inductive charging system comprises a charge station including a power source, a charge probe coupled to a slidable alignment mechanism, and a charge port disposed in the electric vehicle that is coupled to the propulsion batteries thereof. The charge probe comprises a primary core, a primary winding electrically connected to the power source, and a plurality of aligning plates disposed at predetermined locations around the periphery thereof. The slidable alignment mechanism comprises a plurality of vertical slide mechanisms, a plurality of horizontal slide mechanisms coupled between the plurality of vertical slide mechanisms, and a plurality of lateral slide mechanisms coupled to the plurality of horizontal slide mechanisms and to the charge probe.

The charge port comprises a secondary core, a secondary winding that is electrically connected to the propulsion batteries of the electric vehicle, a vehicle brake switch for sending a signal that causes the electrical vehicle to stop when the charge probe is properly inserted into the charge port, and a plurality of rollers disposed adjacent a front surface of the charge port that contact corresponding ones of the aligning plates when the probe is inserted into the charge port.

In operation, the electric vehicle pulls up to the charge station and generally aligns the charge probe to the charge port. If the charge port and charge probe are misaligned, one or more of the rollers contact the corresponding ones of the aligning plates which cause the charge probe to move in a direction opposite the force exerted by the rollers on the aligning plates. Consequently, the charge probe is caused to move up or down, or laterally, as the case may be, so that the charge probe is aligned with the charge port. Thus, as the electric vehicle pulls forward, the charge probe and its primary core and winding moves to align with the charge port and its secondary core and winding. The vehicle brake switch sends a signal to stop the electric vehicle when the charge probe is properly inserted into the charge port. Charging begins after the electric vehicle stops.

The present invention allows an operator of the electric vehicle to charge its propulsion batteries by driving up to the charge probe, and wherein the the charge probe self-aligns to the charge port on the electric vehicle to engage them. The present invention allows an electric vehicle to be charged without the operator physically handling a plug or charging device.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
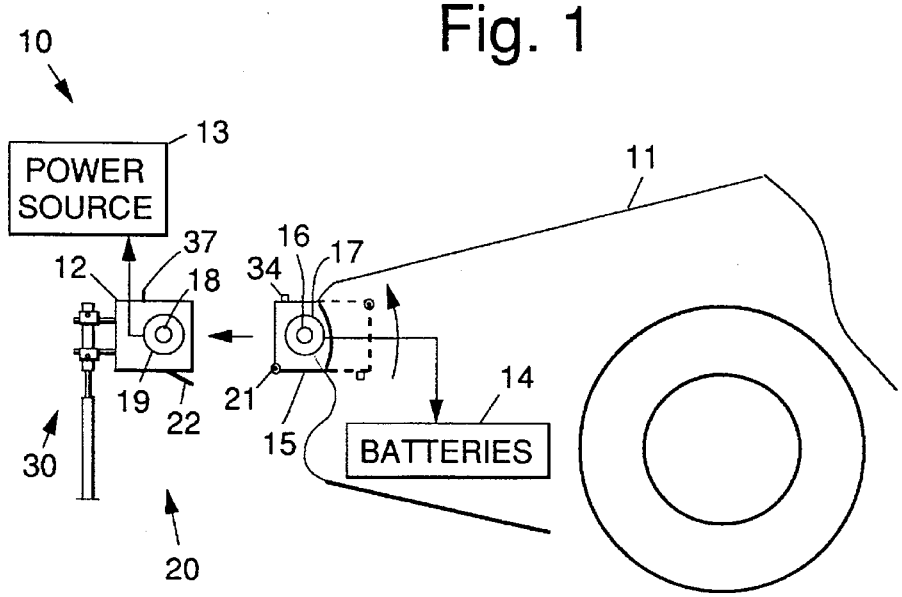
FIG. 1 illustrates a self-aligning inductive charging system for automatically mating primary and secondary cores without operator interaction in accordance with the principles of the present invention.

Referring to the drawing figures, FIG. 1, it illustrates a self-aligning inductive charging system 10 in accordance with the principles of the present invention that is used to charge propulsion batteries 14 of an electric vehicle 11. The self-aligning inductive charging system 10 comprises a charge station 20 including a charge probe 12 that includes a primary core 18 and a primary winding 19 or windings. The primary winding 19 of the charge probe 12 are electrically connected to a power source 13 that is used to provide charging power to charge the propulsion batteries 14 of the electric vehicle 11.

The electric vehicle 11 has a charge port 15 that comprises a secondary core 16 and secondary winding 17. The charge port 15 is mounted at the front of the electric vehicle 11 and is rotatable, or otherwise moveable, so that it may be hidden and stored within the body of the electric vehicle 11 when not in use. FIG. 1 shows two positions of the charge port 15 illustrating it in a stored position (phantom) and rotated into a charging position (solid). The self-aligning inductive charging system 10 is designed to automatically mate the charge probe 12 to the charge port 15. A vehicle brake switch 34 is disposed adjacent the front of the charge port 15 and is adapted to send a signal that causes the electrical vehicle 11 to stop when the charge probe 12 is properly inserted into the charge port 15, and the switch 34 presses against a stop 37 on the charge probe 12. The primary and secondary cores 18, 16 and windings 19, 17 are caused to automatically align with each other such that the probe 12 properly inserts into the charge port 15 without requiring operator interaction with the charging system 10. This will be described in more detail with reference to FIGS. 2–4.

Figure 2:
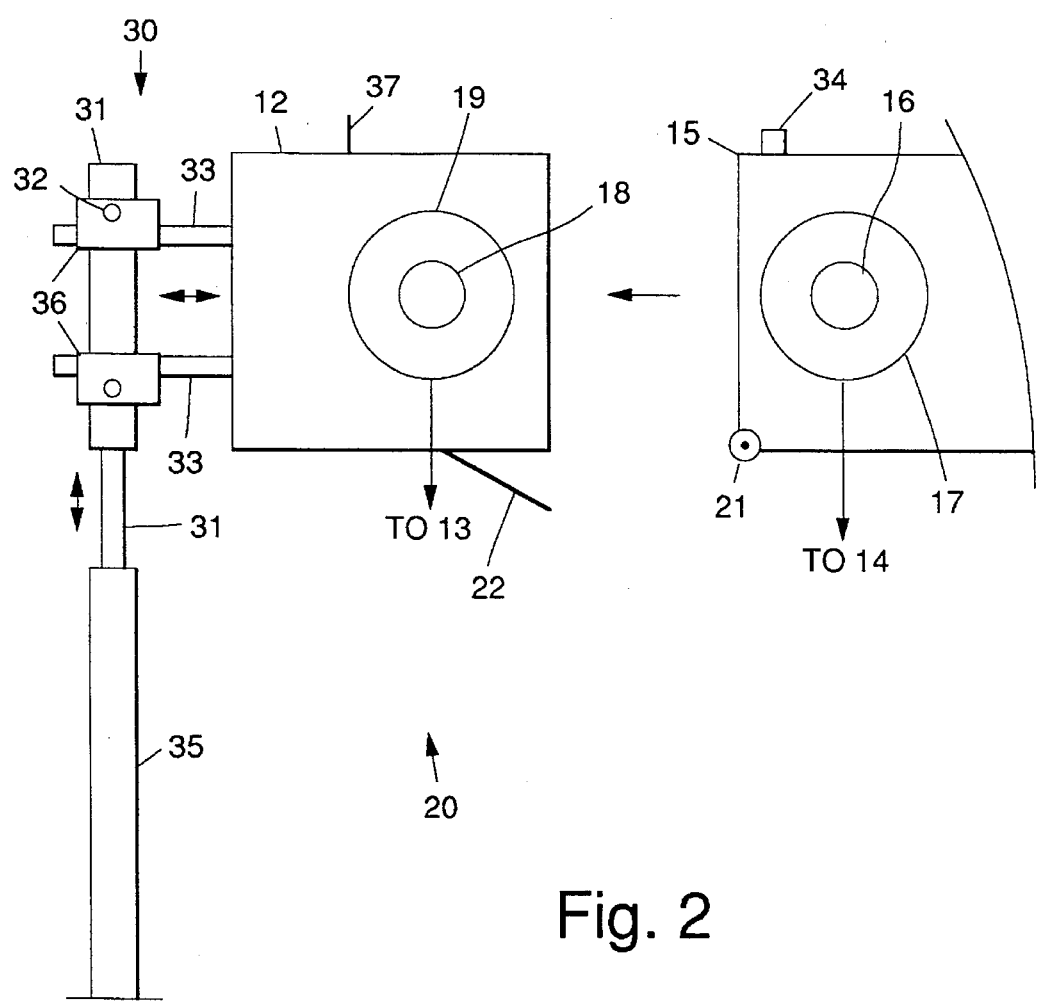
FIGS. 2, 3, and 4 show side, rear and top views, respectively, of the self-aligning inductive charging system of FIG. 1.
Figure 3:
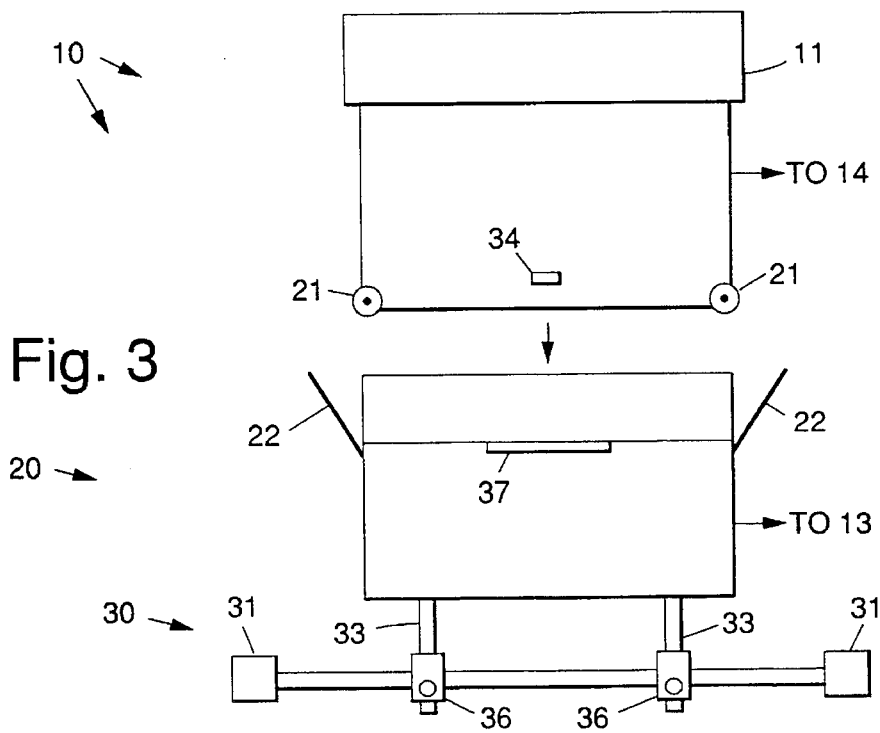
Figure 4:
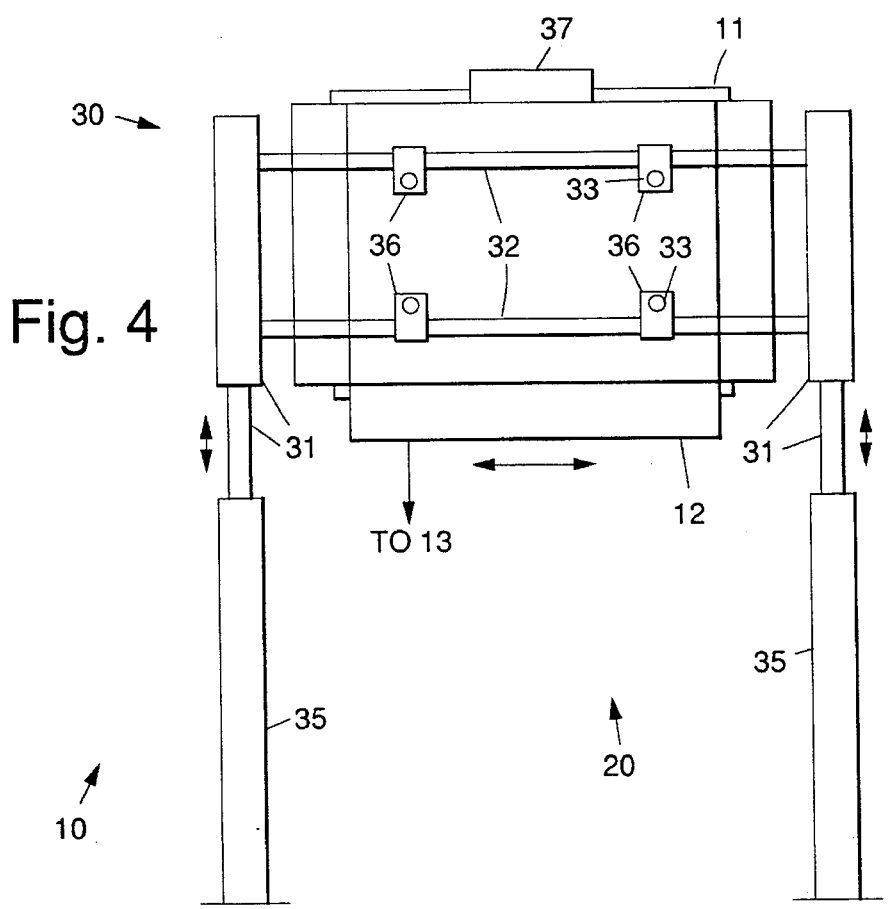

FIGS. 2, 3, and 4 show enlarged side, top and rear views, respectively, of the self-aligning inductive charging system 10 of FIG. 1. The port 15 includes a plurality of rollers 21 disposed adjacent a front surface thereof. The charge probe 12 includes a plurality of aligning plates 22 that are disposed around the periphery thereof. The plurality of aligning plates 22 are disposed at the sides and bottom of the charge probe 12. The rollers 21 are designed to contact the aligning plates 22 when the port 15 is inserted into the charge probe 12. The charge probe 12 is also mounted to a slidable alignment mechanism 30 comprising a plurality of vertical slide mechanisms 31 that are free to move in a vertical direction. The plurality of vertical slide mechanisms 31 are secured by a plurality of vertical rods 35 or other mounting arrangement, for example, that physically secures the charge station 20. A plurality of lateral slide mechanisms 32 are coupled between the plurality of vertical slide mechanisms 31. A plurality of horizontal slide mechanisms 33 are slidably coupled to the plurality of lateral slide mechanisms 32 by means of mounting brackets 36. The charge probe 12 is slidably secured to the plurality of horizontal slide mechanisms 32. The plurality of mounting brackets 36 comprise a plurality of lateral slide mechanisms 33 that are coupled to the charge probe 12.

The vertical, horizontal, and lateral slide mechanisms 31, 32, 33 provide for relatively free movement of the charge probe 12 in up-and-down, side-to-side, and in-and-out directions. The rollers 21 on the charge port 15 are designed to ride on corresponding ones of the aligning plates 22 if the charge probe 12 and charge port 15 are not exactly aligned. In operation, the electric vehicle 11 pulls up to the charge station 12 and generally aligns the charge port 15 to the charge probe 12. If the charge probe 12 and charge port 15 are misaligned, one or more of the rollers 21 contact the corresponding ones of the aligning plates 22 which causes the charge probe 12 to move in a direction opposite the force exerted by the rollers 21 on the aligning plates 22. Consequently, the charge probe 12 is caused to move up or down, or laterally, as the case may be, so that the charge probe 12 is aligned with the charge port 15. Thus, as the electric vehicle 11 pulls forward, the charge probe 12 and its primary core and winding moves to align with the charge port 15 and its secondary core 16 and winding. The vehicle brake switch 34 sends a signal to stop the electric vehicle 11 when the charge probe 12 is properly inserted into the charge port 15. Charging begins after the electric vehicle 11 stops.

Thus there has been described a new and improved self-aligning charging mechanism that provides for mating primary and secondary cores of an inductive charger without requiring user interaction with the charging mechanism. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A self-aligning inductive charging system comprising:
   a charge station comprising:
      a power source;
      a charge probe that comprises:
         a primary core;
         a primary winding electrically connected to the power source that provides charging power; and
         a plurality of aligning plates disposed at predetermined locations around the periphery of the charge probe;
      a slidable alignment mechanism comprising:
         a plurality of vertical slide mechanisms;
         a plurality of horizontal slide mechanisms coupled between the plurality of vertical slide mechanisms; and
         a plurality of lateral slide mechanisms coupled to the plurality of horizontal slide mechanisms and to the charge probe; and
   a charge port that comprises:
      a secondary core;
      a secondary winding; and
      a plurality of rollers disposed adjacent a front surface of the charge port that contact corresponding ones of the aligning plates when the probe is inserted into the charge port.

2. The system of claim 1 wherein the charge port comprises:
   a switch for providing an output signal indicating when the charge probe is properly inserted into the charge port.

3. The system of claim 1 wherein the charge port is coupled to propulsion batteries of an electrical vehicle and wherein the secondary winding is electrically connected to the propulsion batteries of the electric vehicle.

4. The system of claim 3 wherein the charge port is disposed at the front of the electric vehicle and is rotatable so that it may be hidden and stored within the electric vehicle when not in use.

5. The system of claim 1 wherein the plurality of aligning are disposed at the sides and bottom of the charge probe.

6. A self-aligning inductive charging system for charging propulsion batteries of an electric vehicle, said system 10 comprising:
   a charge station comprising:
      a power source;
      a charge probe that comprises:
         a primary core;
         a primary winding electrically connected to the power source that provides charging :power to charge the propulsion batteries of the electric vehicle; and
         a plurality of aligning plates disposed at predetermined locations around the periphery of the charge probe;
      a slidable alignment mechanism comprising:
         a plurality of vertical slide mechanisms;
         a plurality of horizontal slide mechanisms coupled between the plurality of vertical slide mechanisms; and
         a plurality of lateral slide mechanisms coupled to the plurality of horizontal slide mechanisms and to the charge probe; and
   a charge port disposed in the electric vehicle that comprises:
      a secondary core;
      a secondary winding that is electrically connected to the propulsion batteries of the electric vehicle;
      a vehicle brake switch for sending a signal that causes the electrical vehicle to stop when the charge probe is properly inserted into the charge port; and
      a plurality of rollers disposed adjacent a front surface of the charge port that contact corresponding ones of the aligning plates when the probe is inserted into the charge port.

7. The system of claim 6 wherein the charge port is disposed at the front of the electric vehicle and is rotatable so that it may be hidden and stored within the electric vehicle when not in use.

8. The system of claim 6 wherein the plurality of aligning are disposed at the sides and bottom of the charge probe.

* * * * *